United States Patent [19]
Wallack

[11] Patent Number: 5,802,512
[45] Date of Patent: Sep. 1, 1998

[54] STORAGE, REPLAY AND ERROR DETECTION OF USER-DEFINED QUERIES

[75] Inventor: Peter A. Wallack, Sunnyvale, Calif.

[73] Assignee: Oracle Corporation, Redwood City, Calif.

[21] Appl. No.: 614,382

[22] Filed: Mar. 12, 1996

[51] Int. Cl.⁶ .................................................. G06F 17/30
[52] U.S. Cl. ........................... 707/2; 707/3; 707/4
[58] Field of Search ..................... 395/6; 707/2, 3, 707/4

[56] References Cited

U.S. PATENT DOCUMENTS

| | | | |
|---|---|---|---|
| 5,317,729 | 5/1994 | Mukherjee et al. | 395/603 |
| 5,367,675 | 11/1994 | Cheng et al. | 395/602 |
| 5,515,488 | 5/1996 | Hoppe et al. | 345/440 |
| 5,539,872 | 7/1996 | Mintz et al. | 395/326 |
| 5,548,755 | 8/1996 | Leung et al. | 395/602 |
| 5,590,324 | 12/1996 | Leung et al. | 395/605 |
| 5,592,661 | 1/1997 | Eisenberg et al. | 395/615 |
| 5,600,829 | 2/1997 | Tsatalos et al. | 395/602 |
| 5,617,567 | 4/1997 | Doktor | 395/602 |
| 5,666,526 | 9/1997 | Reiter et al. | 707/2 |

*Primary Examiner*—Wayne Amsbury
*Attorney, Agent, or Firm*—Fliesler Dubb Meyer & Lovejoy

[57] ABSTRACT

The present invention is directed toward a method for storing, verifying and salvaging user-defined queries in a database environment. The method comprises retrieving a stored query and an associated stored application version identifier and comparing the stored application version identifier with a current application version identifier. If the application version identifiers do not match, the entire stored query is checked for validity. If an error is found in the stored query, the query is parsed into subparts and each subpart of the stored query is checked for validity. If a subpart is valid, it is built into a new, updated query. The stored version identifier is updated to reflect the current application version so that verification is not performed again.

31 Claims, 4 Drawing Sheets

200 — Orders

| Customer_Number | Customer_Name | Customer_Address | Customer_State | Customer_Order | Order_Date | Filled_Date | Approved | . . . |
|---|---|---|---|---|---|---|---|---|
| 1 | John Doe | 123 Maple | California | socks | 1/7/96 | | Y | . . . |
| 2 | Jane Doe | 456 Main | California | sweater | 7/6/95 | 9/3/95 | Y | . . . |
| 3 | Rob Brown | 28 Central | Maine | socks | 3/15/95 | 4/2/95 | Y | . . . |
| 4 | Jack Jones | 50 Walnut | California | gloves | 2/1/96 | | Y | . . . |
| . | . | . | . | . | . | . | | |

Unfilled California Orders — 320

| Customer_Number | Customer_Order | Order_Date |
|---|---|---|
| 1 | socks | 1/7/96 |
| 4 | gloves | 2/1/96 |
| . | . | . |

| Version_Identifier | Object_Name | Folder_Name | Where_Clause |
|---|---|---|---|
| 1.0 | Orders | Unfilled California Orders | Filled.date = Null and Customer.state = California |
| . . . . | . . . . | . . . . | . . . . |

*FIG. 3*

STORAGE, REPLAY AND ERROR DETECTION OF USER-DEFINED QUERIES

BACKGROUND OF THE INVENTION

1. Field of Invention

The invention relates to user-defined queries in a database application, and particularly to storing, verifying, and salvaging user-defined queries.

2. Description of Related Art

Many computer programs allow a user to store a vast amount of information and also to access and reorganize that information for later viewing. One method of storing information is to use a database. One type of database, a relational database, stores information in the form of one or more table-type structures, sometimes referred to as objects or entities. Each object is composed of multiple columns and multiple rows.

An object may include a large quantity of information such that viewing by a user of all of the information at once becomes cumbersome and/or unnecessary. Thus, many database applications allow a user to qualify the set of data to be retrieved and viewed. Typically, a user can specify which columns, or attributes, the user would like to view and can also specify which rows, or instances, the user would like to view by specifying that certain conditions be satisfied. Such a request for a qualified set of data is often referred to herein as a user-defined query and results in a subset of an object called a folder.

Applications which allow user-defined queries often provide a way for the user to save and re-execute a query at a later time. However, computer applications are frequently revised and/or updated, often making changes in a displayed screen, such as the addition or removal of restrictions on data, or changes in the data structures (schema), such as the addition or removal of database columns. Thus, later revisions of an application may make a previously saved query invalid.

When the user tries to re-execute the query after an application revision or update, and the query has become at least partially invalid, the user may simply receive an error statement with no indication of what is wrong and no opportunity to salvage those portions of the query which may still be valid. In an extreme case, revisions of an application may simply delete saved user-defined queries in order to avoid this problem.

Moreover, in database applications, literally thousands of user-defined queries are often stored. Once an application update is made, the user is faced with either the possibility of having a substantial number of previously saved queries be invalid under the current application version, or having to hand-check each user-defined query, which may be a daunting task.

Thus, it is desirable to automatically verify the validity of previously saved user-defined queries before they are re-executed. It is further desirable to salvage those parts of the queries that remain valid and to notify the user of those parts that are invalid, giving the user the opportunity to decide how to dispose of those invalid parts.

SUMMARY OF THE INVENTION

The present invention is directed toward a method for storing, verifying and salvaging user-defined queries. It is desirable to verify the validity of user-defined queries, particularly in a database environment, in order to determine if the user-defined queries are still valid under the current version and/or revision of the overlying application running.

A method in accordance with the invention is disclosed and comprises the steps of comparing a stored application version identifier with a current application version identifier to determine if a stored query requires verification, reading the stored query into memory, salvaging portions of the stored query that are still valid, and updating the database with the current application version identifier and resulting query.

The method is advantageous in that it allows upgradeability of the underlying application while preserving user customizations.

BRIEF DESCRIPTION OF THE DRAWINGS

The present invention is described with respect to particular embodiments thereof and reference will be made to the drawings in which:

FIG. 3 is a representational diagram of a table used in one embodiment of the invention for storing certain user-defined information.

DETAILED DESCRIPTION OF THE INVENTION

In accordance with the invention, a method of storing user-defined queries, verifying the validity of those stored user-defined queries, and salvaging portions of a saved user-defined query which are determined to be valid is disclosed. Such a method of storing, verifying and salvaging saved user-defined queries allows for improved upgradeability of the underlying applications while preserving user customizations.

Figure 1:
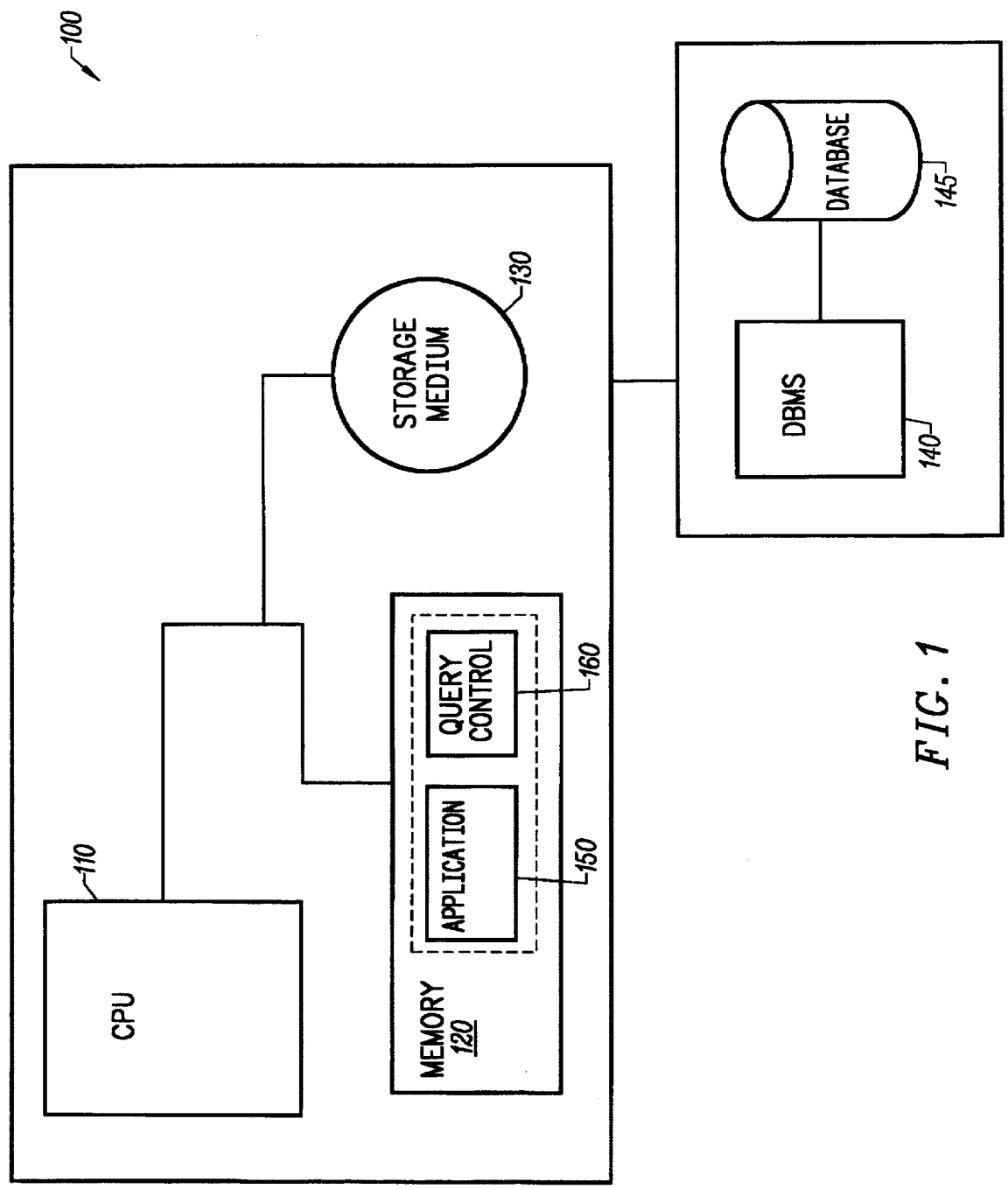
FIG. 1 is a representational block diagram of a computer system used with the present invention.

FIG. 1 shows a computer system 100, having at least a CPU 110, a memory 120, and a storage medium 130. Storage medium 130 may be any machine-readable medium including semiconductor memories, optical and magnetic media (e.g., floppy disks, hard disks, CD-ROM), etc. The computer system 100 is further coupled to a database management system (DBMS) 140 which controls access to the data on database 145. DBMS 140 and/or database 145 may be coupled to or stored on storage medium 130. Alternatively, DBMS 140 and/or database 145 may be remotely coupled to system 100.

In order to aid the end user in accessing database 145 via DBMS 140, various application programs (or tools) have been developed. As shown in FIG. 1, an application 150 resides in memory 120. In an alternative embodiment, application 150 resides in storage medium 130. Application 150 interacts with DBMS 140 to access data on database 145.

One embodiment of the invention is an instruction set, shown as query control 160 in FIG. 1, residing in memory 120 and executed by CPU 110. Query control 160 interacts with application 150 and DBMS 140 to store, verify and salvage user-defined queries (discussed in more detail below). Alternatively, query control 160 may reside in storage medium 130. In yet another embodiment of the invention and as indicated by the dashed lines in FIG. 1, query control 160 may be an instruction set included as part of application 150.

Figure 2:
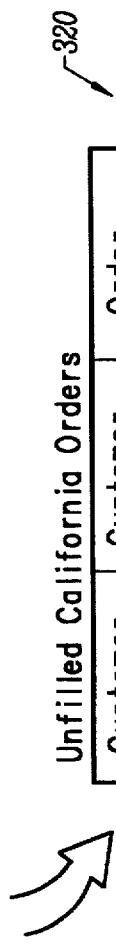
FIG. 2A is a representational diagram of an exemplary object called "Orders"
FIG. 2B is a representational diagram of a folder derived from the object of FIG. 2A.

One commonly used type of database is a relational database, which stores information in the form of one or more table-type structures (referred to herein as objects), composed of columns and rows. FIG. 2A shows a representational diagram of an exemplary relational database object Orders 200. Each column of the object Orders 200 shows a particular attribute or field of the object Orders 200. For instance, column 210 shows "Customer_Number," column 220 shows "Customer_Name," column 230 shows "Customer_Address," column 240 shows "Customer_State," column 250 shows "Customer_Order," column 260 shows "Order_Date," column 270 shows "Filled_Date," and column 280 shows "Approved." Other attributes can be described in other columns.

Each row in the object Orders 200 defines a particular instance or record. For example, row 280 gives the details of an order placed by Customer 1, row 290 gives the details of an order placed by Customer 2, row 300 gives the details for an order placed by Customer 3, row 310 gives the details of an order placed by Customer 4, and so on.

Continuing the example, one particular user of the object Orders 200 may require only the viewing of information relating to which orders from California have not yet been filled. Thus, the user requests to view only those rows which have unknown filled dates for orders going to the state of California. Such a request, if written in Structured Query Language ("SQL") would appear as follows:

SELECT customer_number, customer_order,
  order_date
  FROM Orders
    WHERE customer_state='California' and filled_date
    is null.

"Null" represents an unknown value and is not equivalent to "0". The column names following the SELECT statement further indicate that the user also desires to view fewer than all the columns, namely "Customer_Number," "Customer_Order" and "Order_Date."

The result of the above user-defined query is folder 320 shown in FIG. 2B, where fewer than all the columns of the object Orders 200 are shown and fewer than all the rows in object Orders 200 are also shown. (As used herein, "folder" refers to a subset of the rows and/or columns of a particular object).

In accordance with the invention, once a user defines a query and indicates that it is to be stored, certain information relevant to the query is stored in a table structure such as Table 405 shown in FIG. 3, which, in one embodiment of the invention, is stored in storage medium 130 (FIG. 1). Table 405 includes a version_identifier 400, which identifies the version or revision of the application in which the user-defined query was last run, an object_name 410 identifying the object from which the data is to be retrieved (in this example "Orders"), a folder_name 420 which identifies the folder resulting from the user-defined query, and where_clause information 430 which identifies the criteria by which rows to be displayed are selected.

In storing a user-defined query, a distinction is made between the criteria the user enters and that which the overlying application requires. Only the criteria entered by the user is stored in Table 405, along with an application version identifier. For instance, with reference to the example associated with FIGS. 2A and 2B, user-defined criteria is found in the SQL "WHERE" clause, e.g., "customer_state='California' and filled_date is null" (i.e., column name1=value1 and column name2=value2, etc.). The overlying application 150 may additionally add the limitation that it will only display those rows where approved='Y'. However, such application-defined criteria is not stored.

Information such as that shown in table 405 is merged with any other criteria required by the application, which is not stored in Table 405 (such as "approved='Y'"), at the time the user query (e.g., "unfilled California orders") is re-executed.

Figure 4:
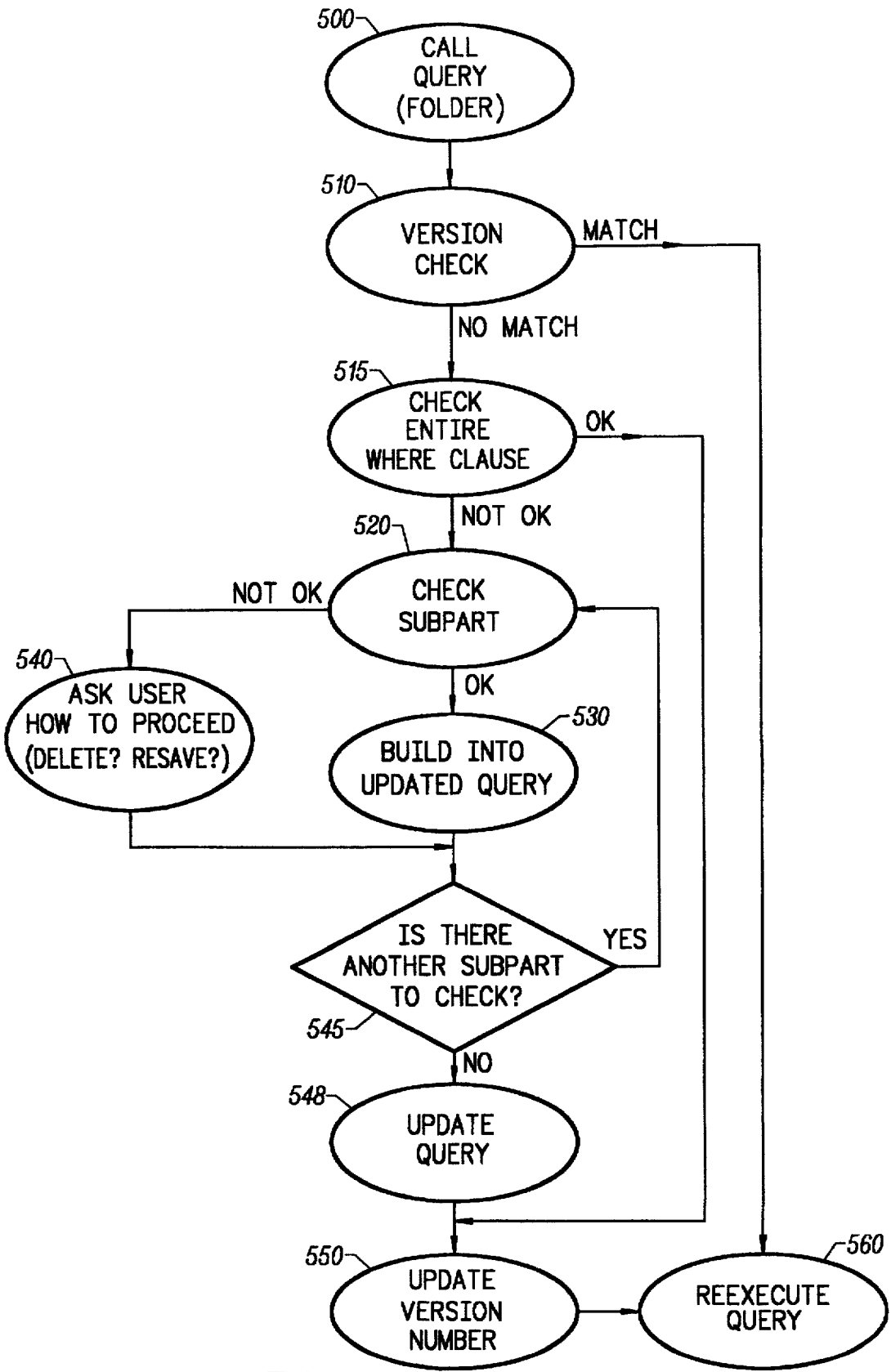
FIG. 4 is a flow diagram representing some of the steps used in implementing one embodiment of the present invention.

When a previously stored query is called, its validity is checked prior to its actual re-execution. Referring to FIG. 4, the steps for checking the validity of a saved user query are generally as follows. Once the query is called, step 500, version identifier 400 stored in table 405 (FIG. 3) is retrieved and checked against the current version identifier for the currently running application, step 510. If the version identifiers match, then the query was last saved or re-executed by the current version of the application and should be valid, and the procedure proceeds to step 560.

If, in step 510, the version identifiers do not match, the user-defined criteria 430, stored in table 405 (in FIG. 3), is retrieved and restructured into a query. Validity of the query is checked by sending the user-defined query for processing by the DBMS, step 515. If no error is returned, the query is still valid in the current application. The version identifier is updated in Table 405 (FIG. 3), step 550, and the query can be executed, step 560.

However, if an error is returned by the DBMS in step 515 then the user-defined query is parsed into subparts and each subpart is checked for validity, step 520. Each subpart, in one embodiment of the invention, is defined as that criteria of the "where_clause" (in FIG. 3) which is separated from other parts of the where_clause by an "and". Of course, if only one condition was specified and there were no "ands" in the where_clause, the user-defined query would have only one subpart. In the where_clause 430 of FIG. 3, "customer_state='California'" is one subpart, and "filled_date is null" is a second subpart. The query defined by each subpart is checked by sending the query for processing by the DBMS. If no error is returned then the subpart is valid, and it is added to a new updated query, step 530, which will eventually be re-saved in Table 405 (step 548). If additional subparts are present, step 545, then each subpart is checked in turn, step 520, and added to the updated query if it is found valid, step 530.

If at step 520 an error is returned after submitting the query to the DBMS, the subpart defining the query is not valid under the current application version. In one embodiment of the invention, the application will inquire of the user as to how to proceed, step 540. For example, the user may be given a choice to delete the invalid part of the query, to modify the invalid part of the query, or to re-save the invalid part of the query.

Once all the subparts have been checked, the updated query, built in step 530, is written into Table 405, step 548, and the version identifier is updated and written into table 405, step 550. The procedure then moves to step 560 ("re-execute query").

An example of SQL code which can be used to check user-defined queries in one embodiment of the invention (e.g., step 515 in FIG. 4) is as follows:

SELECT null
  FROM (object_name from which data is to be retrieved)
    WHERE (entire user-defined where_clause) and 1=2.

In the WHERE clause, the statement 1=2 creates a situation where no rows will be returned (because the statement will never be true) yet is syntactically correct. In the SELECT clause, "null" can be replaced with "x" and indicates that column names are unnecessary to perform a verification of the stored query. This SQL statement is constructed dynamically at runtime.

To check each subpart, step 520, an SQL query is formed and is structured similarly to that used in step 515 except only one subpart of the entire WHERE clause is used (e.g., WHERE customer_state='California' and 1=2). Thus, the scheme of one embodiment of the present invention utilizes the error-detection features of the underlying database (e.g., error statements) to verify the SQL statements.

In addition, in one embodiment of the invention, the query is re-executed (step 560) immediately after the query is verified. In other words, the verification steps (steps 510 through 550) described with respect to FIG. 4 are performed every time a query is called for re-execution. In an alternative embodiment of the invention, all stored queries are called for verification immediately following an application update, and thus, subsequent re-execution (step 560) may be delayed until a later time.

Thus, the method in accordance with the present invention serves to allow upgrades of underlying applications while preserving the customizations made by the user to the greatest extent possible. It is useful in any type of database system, including flat and/or relational databases, particularly where renaming or deletion of columns is possible.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of verifying a stored query, comprising the steps of:
   (a) comparing a stored application version identifier, which is associated with said stored query, with a current application version identifier;
   (b) salvaging said stored query; and
   (c) updating said stored application version identifier to be said current application version identifier.

2. The method of claim 1, wherein steps (b) and (c) are performed when said first application version identifier is different from said current application version identifier.

3. The method of claim 1, wherein step (b) includes determining if said stored query is valid in a current application.

4. The method of claim 3, wherein step (b) further includes the step of forming an updated query.

5. The method of claim 4, further comprising the step of executing said updated query.

6. The method of claim 4, wherein step (c) includes storing said current version identifier in a table and wherein step (b) includes storing said updated query in said table.

7. The method of claim 3, wherein the step of determining if said stored query is valid further includes the steps of:
   parsing said stored query into at least one subpart; and
   determining if said subpart is valid in said current application.

8. The method of claim 7, further comprising the step, if said subpart is valid, of forming an updated query with at least said subpart.

9. The method of claim 8, further comprising the step of executing said updated query.

10. The method of claim 7, further comprising the step, if said subpart is invalid, of inquiring, by said current application of a user, as to how to dispose of said subpart.

11. The method of claim 10, wherein said step of inquiring includes inquiring if said subpart should be saved.

12. The method of claim 1, further comprising the step of retrieving said stored query and said stored application version identifier from a table.

13. The method of claim 1, wherein step (c) includes storing said current version identifier in a table.

14. A method of verifying a stored query for use with a database environment, said stored query comprising at least a first subpart comprising the steps of:
   a) calling said stored query;
   b) comparing a stored application version identifier, which is associated with said stored query, with a current application version identifier;
   c) if said stored application version identifier is different from said current application version identifier, determining if said stored query is valid in said current application;
   d) if said stored query is invalid in said current application, determining if said first subpart of said stored query is valid in said current application;
   e) if said first subpart is valid, building an updated query with at least said first subpart;
   f) updating said stored application version identifier to be said current application version identifier; and
   g) executing said updated query.

15. The method of claim 14, further comprising the step of, if said first subpart is invalid, inquiring by said current application of a user, as to how to dispose of said first subpart.

16. The method of claim 15, wherein step of inquiring includes inquiring if said first subpart should be saved.

17. The method of claim 14, wherein step (a) further includes retrieving said stored query and said stored application version identifier from a table.

18. The method of claim 14, wherein step (e) includes storing said updated query in a table and wherein step (f) includes storing said current application version identifier in said table.

19. A computer readable medium having a set of instructions stored therein, which when executed by a computer, causes the computer to perform the steps of:
   (a) calling a stored query associated with a stored application version identifier;
   (b) comparing said stored application version identifier with a current application version identifier;
   (c) salvaging said stored query; and
   (d) updating said stored application version identifier to be said current application version identifier.

20. The computer readable medium of claim 19, wherein steps (c) and (d) are performed when said stored application version identifier is different from said current application version identifier.

21. The computer readable medium of claim 19, wherein the instructions for performing step (c) further include instructions for determining if said stored query is valid in a current application.

22. The computer readable medium of claim 21, wherein the instructions for performing step (c) further include instructions for performing the step of forming an updated query.

23. The computer readable medium of claim 22, further comprising instructions for performing the step of executing said updated query.

24. The computer readable medium of claim 22, wherein the instructions for performing step (d) include instructions for storing said current version identifier in a table and wherein the instructions for performing the step of forming an updated query include instructions for storing said updated query in said table.

25. The computer readable medium of claim 21, wherein the instructions for performing the step of determining if said stored query is valid further include instructions for performing the steps of:

parsing said stored query into at least one subpart; and determining if said subpart is valid in said current application.

26. The computer readable medium of claim 25, further comprising instructions for performing the step, if said subpart is valid, of forming an updated query with at least said subpart.

27. The computer readable medium of claim 26, further comprising instructions for performing the step of executing said updated query.

28. The computer readable medium of claim 25, further comprising instructions for performing the step, if said subpart is invalid, of inquiring, by said current application of a user, as to how to dispose of said subpart.

29. The computer readable medium of claim 28, wherein the instructions for performing said step of inquiring include instructions for inquiring if said subpart should be saved.

30. The computer readable medium of claim 19, wherein the instructions for performing step (a) further include instructions for retrieving said stored query and said stored application version identifier from a table.

31. The computer readable medium of claim 19, wherein the instructions for performing step (d) include instructions for storing said current version identifier in a table.

* * * * *